(12) United States Patent
Hyun

(10) Patent No.: US 6,955,315 B2
(45) Date of Patent: Oct. 18, 2005

(54) APPARATUS FOR PREVENTING BACKLASH OF SPOOL USED IN BAITCASTING REEL

(75) Inventor: Kang-ho Hyun, Bucheon (KR)

(73) Assignee: Doyo Engineering Co., Ltd., Bucheon (KR)

( * ) Notice: Subject to any disclaimer, the term of this patent is extended or adjusted under 35 U.S.C. 154(b) by 42 days.

(21) Appl. No.: 10/779,434

(22) Filed: Feb. 13, 2004

(65) Prior Publication Data
US 2005/0178872 A1 Aug. 18, 2005

(51) Int. Cl.⁷ .............................................. A01K 89/02
(52) U.S. Cl. ................................. 242/289; 188/181 A
(58) Field of Search .................... 242/289; 188/181 A, 188/185

(56) References Cited

U.S. PATENT DOCUMENTS

| 5,356,090 A | * | 10/1994 | Sato | 242/289 |
| 5,393,005 A | * | 2/1995 | Nakajima | 242/289 |
| 5,542,619 A | * | 8/1996 | Karlsson | 242/289 |
| 6,364,230 B1 | * | 4/2002 | Kawasaki | 242/289 |
| 6,371,396 B1 | * | 4/2002 | Kawasaki | 242/289 |
| 6,416,001 B1 | * | 7/2002 | Chang | 242/289 |
| 6,435,438 B1 | * | 8/2002 | Hyon | 242/289 |

* cited by examiner

Primary Examiner—Emmanuel M Marcelo
(74) Attorney, Agent, or Firm—Notaro & Michalos P.C.

(57) ABSTRACT

Disclosed is an apparatus for preventing backlash of a spool used in a baitcasting reel, in which the number of brake shoes can be optionally adjusted. The position of the shoe is selected between protruded guides of a shoe holder so as to apply braking force, so that the backlash of the spool is precisely controlled, without decreasing the carry distance of casting.

3 Claims, 6 Drawing Sheets

APPARATUS FOR PREVENTING BACKLASH OF SPOOL USED IN BAITCASTING REEL

BACKGROUND OF THE INVENTION

1. Field of the Invention

The present invention relates to a fishing reel, and more particularly, to an apparatus for preventing backlash of a spool used in a baitcasting reel, in which the spool is smoothly and precisely braked by easily adjusting the number of operating shoes 2. Background of the Related Art In baitcasting reels, if a flying speed of a sinker containing bait does not coincide with an unwinding speed of a fishing line from a spool upon casting, there is a phenomenon that the fishing line is excessively unwound from the spool and thus the fishing line is tangled around the spool. In order to prevent the phenomenon, a centrifugal brake for to controlling a rotating speed of the spool is utilized. It is difficult for the conventional centrifugal brake to precisely control braking force. Further, since braking force is uniformly fixed when the reel is manufactured, it is inconvenient to use the baitcasting reel. In addition, there are another problems of reduced casting distance and abrasion of a brake shoe and a braking ring.

SUMMARY OF THE INVENTION

Accordingly, the present invention is directed to a backlash preventing apparatus for a baitcasting reel that substantially obviates one or more problems due to limitations and disadvantages of the related art.

An object of the present invention is to provide an apparatus for preventing backlash of a spool, in which a decreased carry distance can be improved and a durability of components can be remarkably increased.

To achieve the object and other advantages, according to one aspect of the present invention, there is provide an apparatus for preventing backlash of a spool used in a baitcasting reel, the apparatus comprising: a shoe holder including an opening formed at a center of the holder, through which a shaft of the spool passes, at least two pairs of protruded guides formed radially from the opening and having stop bosses symmetrically formed inside the pair of the protruded guides, and a hole formed between the pair of protruded guides; at least two shoes having a body inserted between the pair of the protruded guides, a stop boss symmetrically formed at both outer surfaces of the body to abut against the stop bosses of the shoe holder, a protruded frictional portion formed at a front of the shoe to contact with a braking ring, a knob formed at a rear of the shoe, and a hole formed at a center of the shoe; a spring interposed between the hole of the shoe holder and the hole of the shoe to urge the shoe against the spool shaft; a shoe supporting plate, fixed to the shoe holder 10 by fastening a screw into a threaded hole of the shoe holder, for preventing components from being released from the she holder, and having a hole through which the shaft of the spool passes and at least two rectangular slots through which the knob of the shoe passes; and a braking ring mounted to an inner body to be contacted with the frictional portion of the shoe protruded from the shoe holder.

The spring may be replaced by a resilient rubber or an inverted U-shaped leaf spring.

Preferably, the shoe supporting plate is made of a non-magnetic material.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

A preferred embodiment according to the present invention will now be explained with reference to the accompanying drawings.

Figure 1:
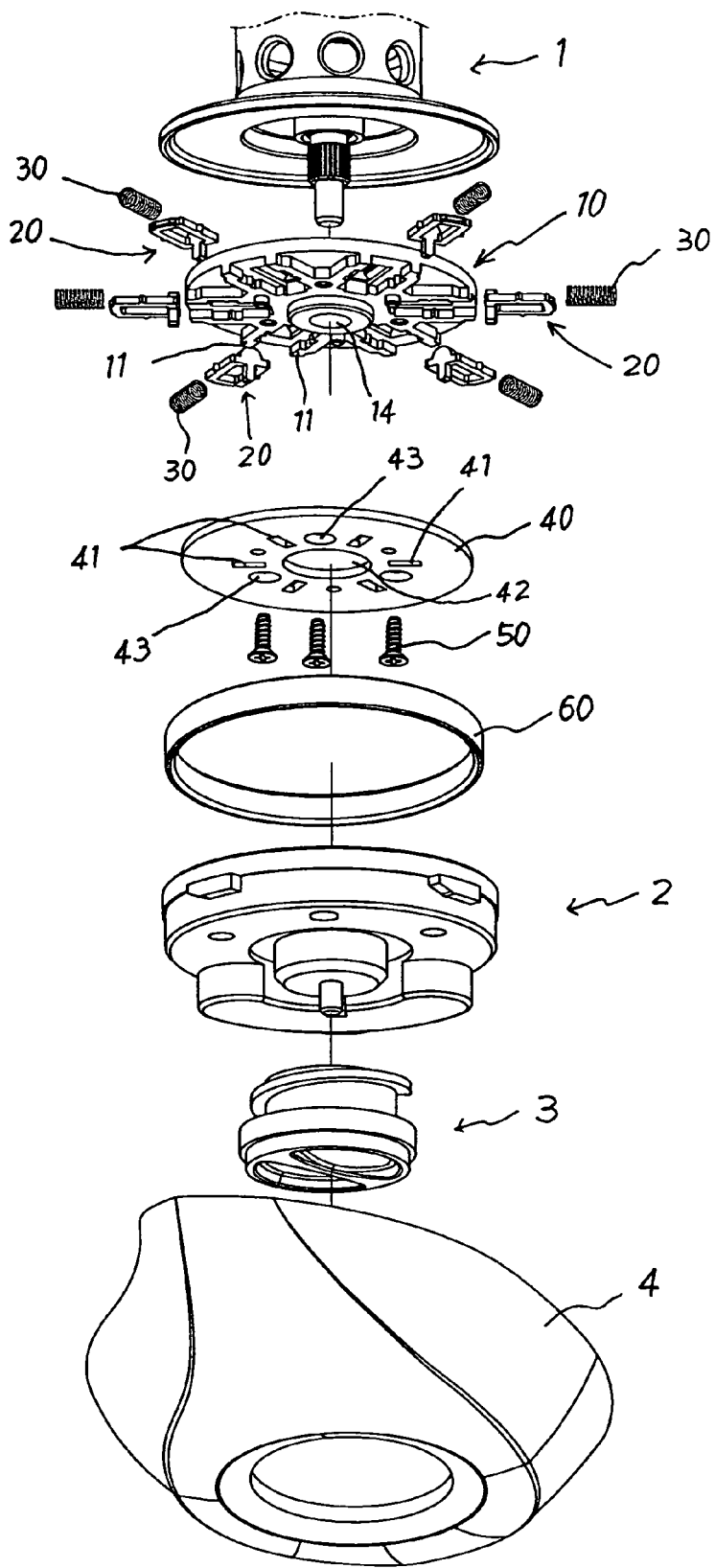
FIG. 1 is an exploded perspective view of an apparatus for preventing backlash of a spool according to one preferred embodiment of the present invention.

Referring to FIG. 1, an apparatus for preventing backlash of a spool for used in a baitcasting reel according to one preferred embodiment of the present invention includes a shoe holder 10, a shoe supporting plate 40 assembled to the shoe holder, and a braking ring 60.

The shoe holder 10 includes an opening 14 formed at a center of the holder, through which a shaft of a spool 1 passes. The shaft of the spool 1 passes through the opening 14 of the shoe holder 10 and an opening 42 of the shoe supporting plate 40, and is supported by a bearing assembled to a spool cover 2. At least two pairs of protruded guides 11 are formed radially from the opening 14. In this embodiment, six pairs of the protruded guides 11 are formed so that six shoes 20 are assembled between the pairs of the protruded guides 11. In other words, the number of protruded guides 11 may be deceased to use at least two or more shoes 20. Stop bosses 12 are symmetrically formed inside the pair of the protruded guides 11. An end of the stop boss 12 has a triangular or circular shape. A hole 13 is formed between the pair of protruded guides 11, so that an upper protruded portion of the shoe 20 is inserted into the hole 13. However, if a spring 30 of a small diameter is used, the hole 13 is not necessary.

Also, the shoe holder 10 is formed with at least two threaded holes 15 so that the shoe supporting plate 40 is mounted to the shoe holder by fastening a screw 50 into the threaded hole 15.

Figure 2:
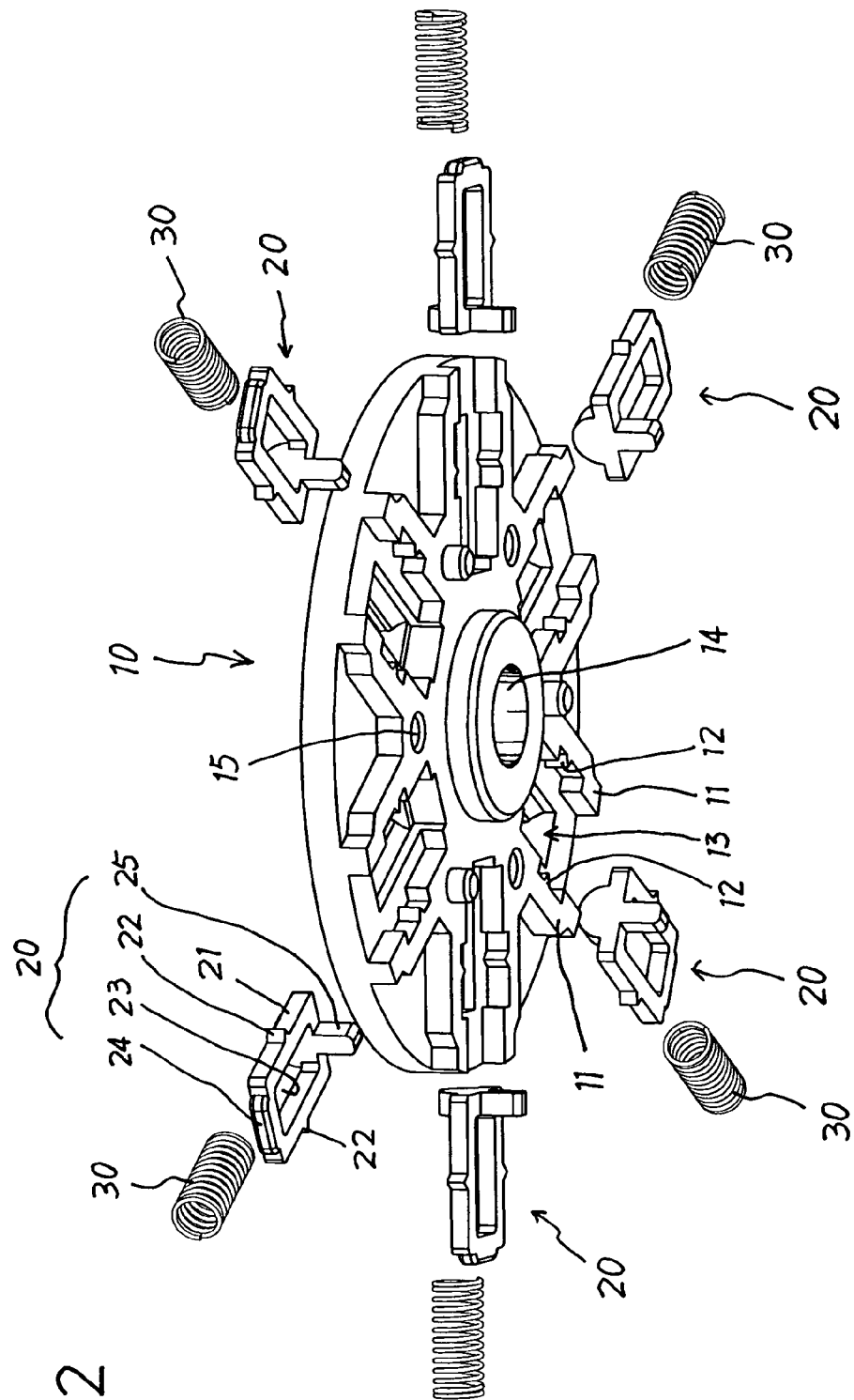
FIG. 2 is an exploded perspective view of a shoe holder.
Figure 3:
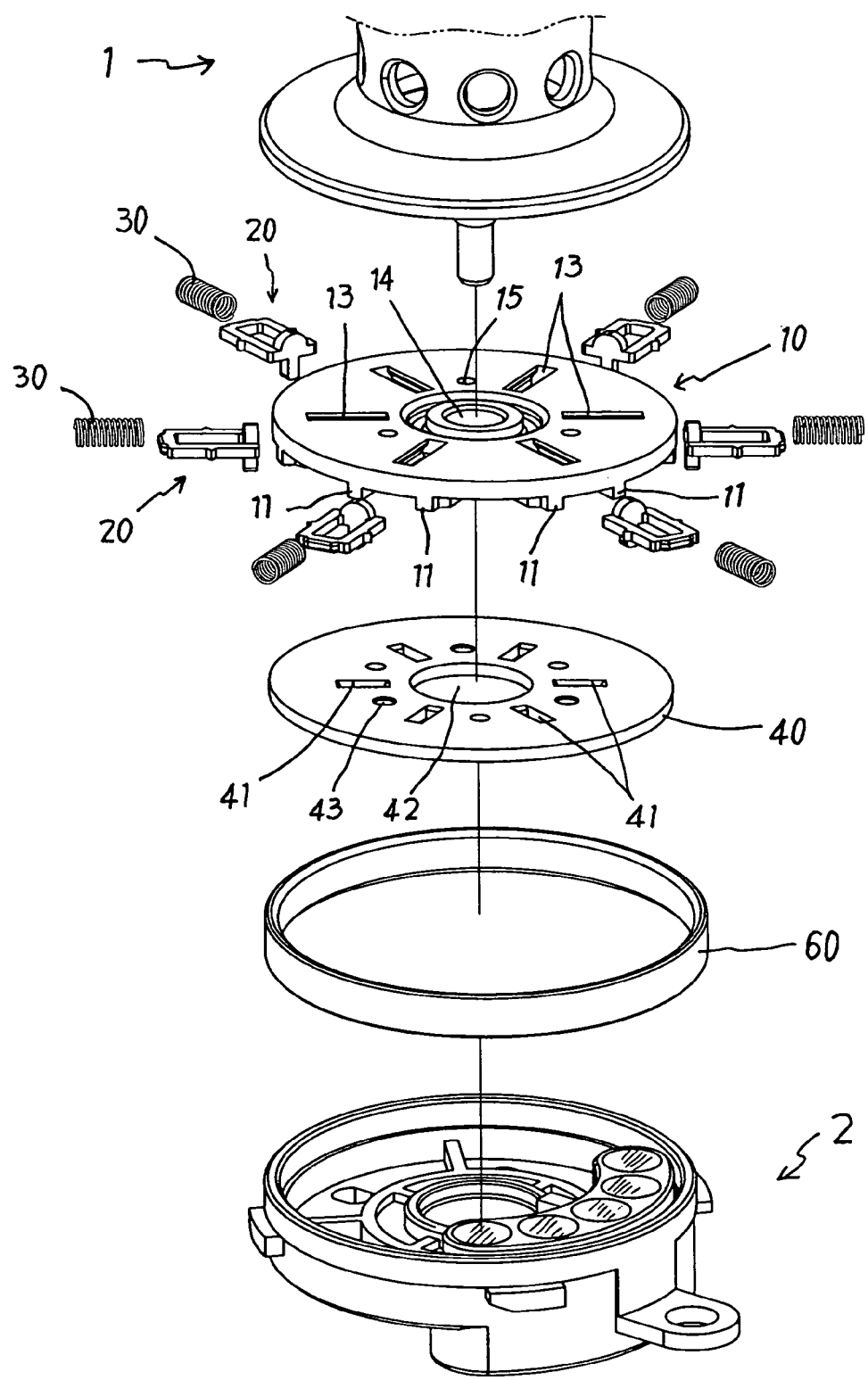
FIG. 3 is an exploded perspective view showing a state where a brake of the present invention is assembled to a spool.

As shown in FIGS. 1 and 2, the shoes 20 are inserted into the pairs of protruded guides 11 of the shoe holder 10. The shoe has a stop boss 22 symmetrically formed at an outer surface of a rectangular body. Preferably, the stop boss 22 has the same shape as that of the stop boss 12 of the shoe holder 10. The shoe 20 is formed with a hole 23 at a center of the shoe so that the body with the stop boss formed has resilience. The shoe 20 is also formed with a protruded frictional portion 24 at a front of the shoe to apply frictional force to the braking ring 60, and a knob 25 opposite to the frictional portion to be pulled or pushed by a hand.

The spring 30 is interposed between the hole 13 of the shoe holder 10 and the hole 23 of the shoe 20, with the shoe 20 being assembled between the protruded guides 11 of the shoe holder 10. The spring 30 positions the shoe 20 in a proper position. If the shoe 20 and the spring 30 are positioned in the shoe holder 10, the shoe supporting plate 40 is secured to the shoe holder 10 by means of the screw 50. The shoe supporting plate 40 is made of plastic, but may be made of nonmagnetic material. The reason is that a permanent magnet is assembled to an interior of the spool cover 2 to additionally provide the reel with a magnetic brake system.

Figure 4:
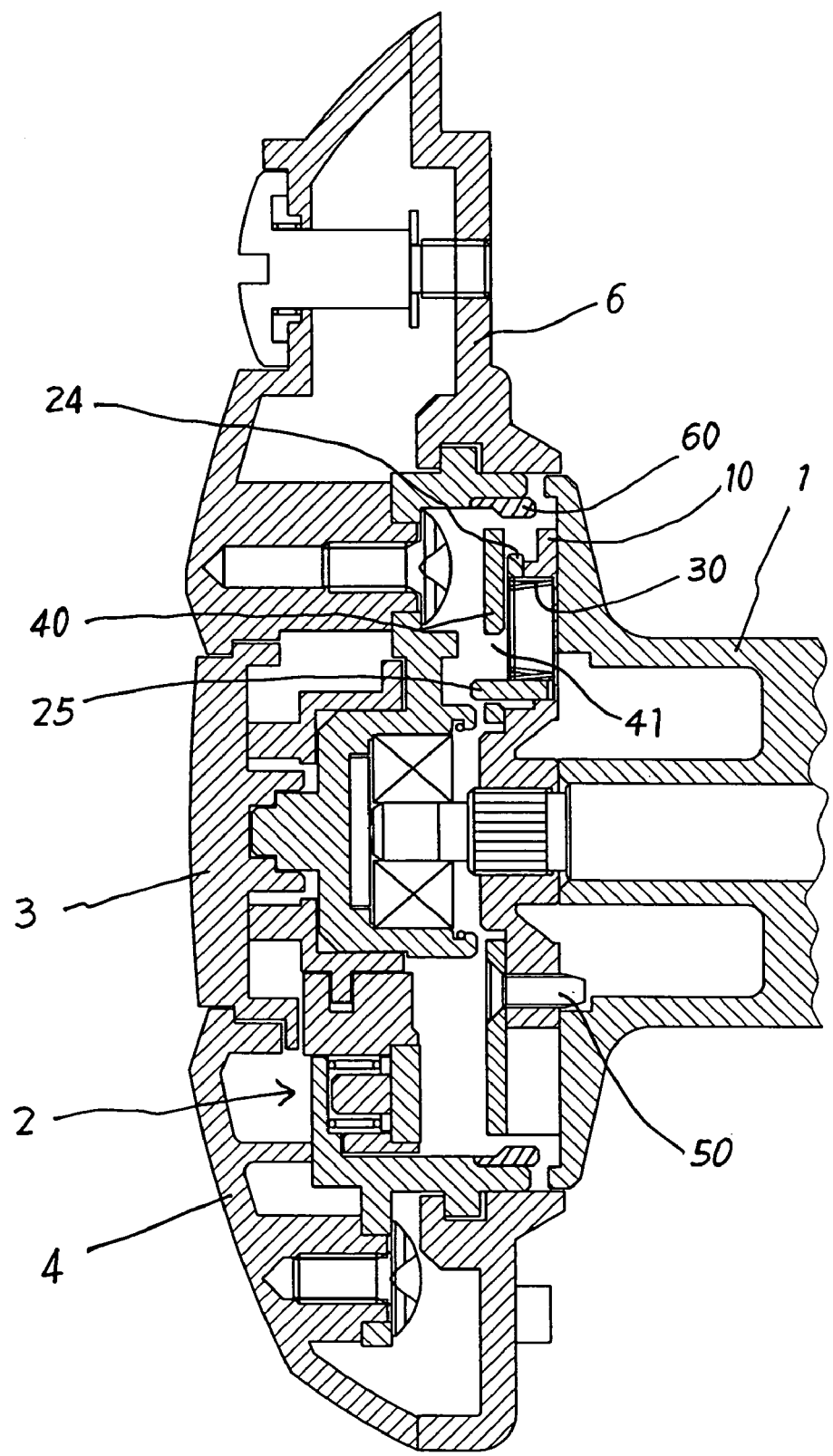
FIGS. 4 and 5 are cross-sectional view of an apparatus according to the present invention.
Figure 5:
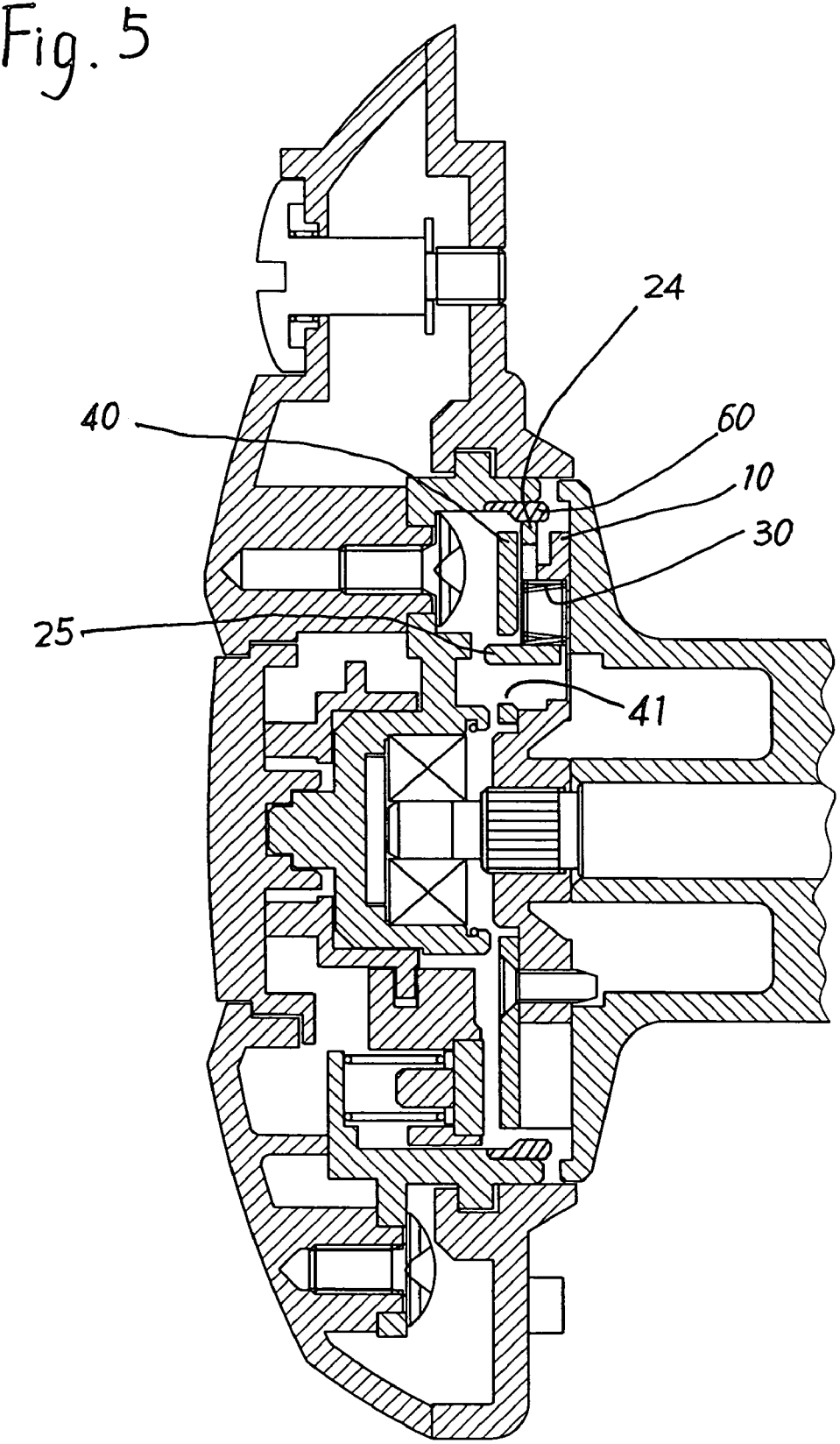

As shown in FIGS. 4 and 5, the shoe supporting plate 40 is formed with at least two rectangular slots 41 formed around the opening 42 through which the knob 25 of the shoe 20 passes.

The shoe holder 10, the shoes 20, the springs 30, and the shoe supporting plate 40, the spool 1, a spool cover 2, and a dial are interposed between an inner body 6 and a side cover 4. The braking ring 60 is positioned inside the side cover 4.

Figure 6:
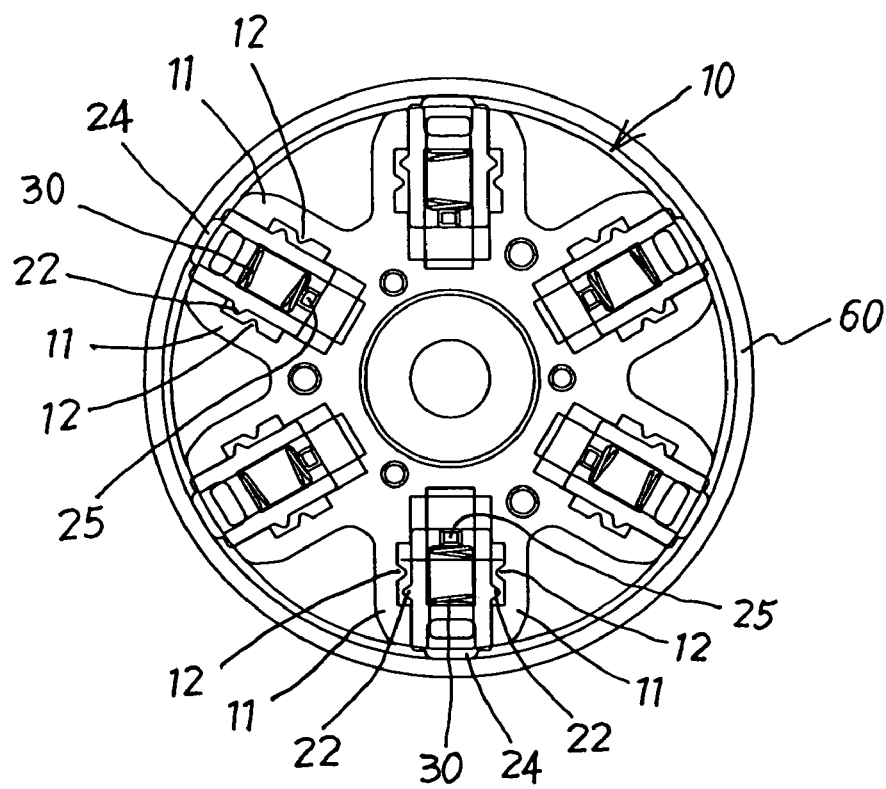
FIGS. 6 and 7 are views showing the operating state of shoes.

Referring to FIGS. 4 and 6, the stop boss 22 of the shoe 20 is positioned out of the stop boss 12 of the shoe holder 10 to face the braking ring 60, so that the shoe 20 can freely move. The shoe 20 is always pressed toward the spool shaft by the resilience of the spring 30. If the spool 1 rotates, the shoe 20 is urged to move toward the braking ring 60 against the spring 30, and thus the protruded frictional portion 24 is contacted with an inner surface of the braking ring 60 (see FIG. 4). Therefore, the protruded frictional portion 24 applies the frictional force to the braking ring.

Figure 7:
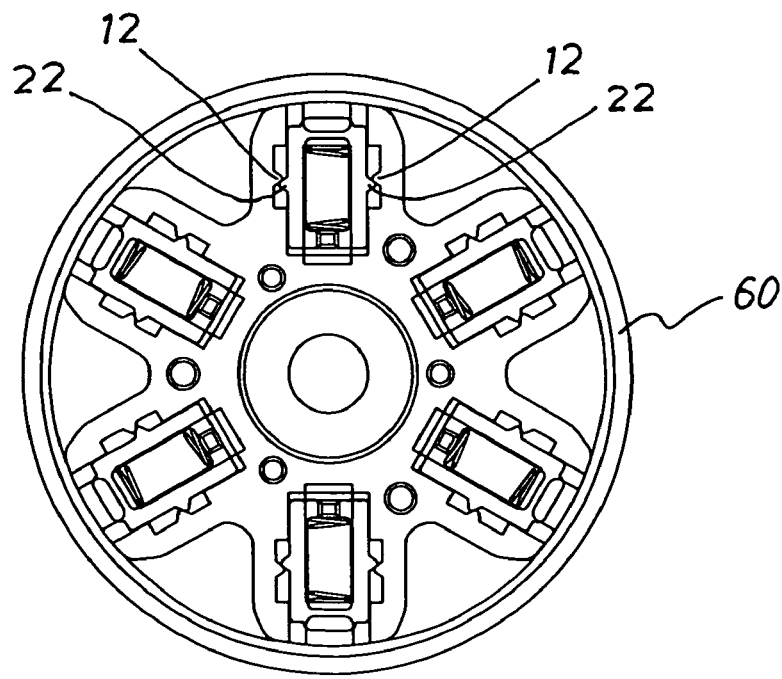

Referring to FIGS. 4 and 7, it will be understood that the protruded frictional portion 24 of the shoe 20 is not contacted with the braking ring 60. Specifically, the stop boss 22 of the shoe 20 passes by the stop boss 12 of the shoe holder 10, and is positioned close to the shaft of the spool 1. Since the shoe 20 is urged by biasing force of the spring 30, it is difficult for the stop boss 22 of the shoe 20 to pass by the stop boss 12 of the shoe holder 10 to the position as shown in FIG. 6. At this state, the shoe 20 does not apply the frictional force to the braking ring.

Specifically, if the cover 4 is detached from the inner cover 6 of the reel body, a surface of the shoe holder 10 is exposed as shown in FIG. 7. If the knob 25 is moved toward the braking ring 60 by a finger, the stop boss 22 of the shoe 20 pushes and passes the stop boss 12 of the shoe holder 10 to the position as shown in FIG. 6. Since the body of the shoe 20 is formed with the hole 23, the shoe has the elasticity in itself. Therefore, the stop boss 22 can pass by the stop boss 12 not by force. It will be understood that since two or more shoes 20 are selectively moved, the braking force can be adjusted by selecting the number of the shoes.

The spring 30 may be replaced by a resilient rubber or an inverted U-shaped leaf spring.

With the structure of the apparatus, the number of the brake shoes can be easily selected to achieve the proper braking force. Therefore, the braking force can be easily controlled and thus the backlash of the spool can be prevented.

Accordingly, the rotation of the spool is controlled more ideally, and a decreased phenomenon of carry distance can be improved. Further, a durability of components related to the apparatus for preventing the backlash can be remarkably increased.

The forgoing embodiment is merely exemplary and is not to be construed as limiting the present invention. The present teachings can be readily applied to other types of apparatus. The description of the present invention is intended to be illustrative, and not to limit the scope of the claims. Many alternatives, modifications, and variations will be apparent to those skilled in the art.

What is claimed is:

1. An apparatus for preventing backlash of a spool used in a baitcasting reel, the apparatus comprising:

a shoe holder including an opening formed at a center of the holder, through which a shaft of the spool passes, at least two pairs of protruded guides formed radially from the opening and having stop bosses symmetrically formed inside the pair of the protruded guides, and a hole formed between the pair of protruded guides;

at least two shoes having a body inserted between the pair of the protruded guides, a stop boss symmetrically formed at both outer surfaces of the body to abut against the stop bosses of the shoe holder, a protruded frictional portion formed at a front of the shoe, a knob formed at a rear of the shoe, and a hole formed at a center of the shoe;

a spring interposed between the hole of the shoe holder and the hole of the shoe to urge the shoe against the spool shaft;

a shoe supporting plate, fixed to the shoe holder by fastening a screw into a hreaded hole of the shoe holder, for preventing components from being released from the shoe holder, and having a hole through which the shaft of the spool passes and at least two rectangular slots through which the knob of the shoe passes; and a braking ring mounted to an inner body to be contacted with the frictional portion of the shoe protruded from the shoe holder.

2. The apparatus as claimed in claim 1, wherein the spring comprises a resilient rubber or an inverted U-shaped leaf spring.

3. The apparatus as claimed in claim 1, wherein the shoe supporting plate is made of a nonmagnetic material.

* * * * *